United States Patent [19]

Schumacher et al.

[11] 4,056,108
[45] Nov. 1, 1977

[54] TOBACCO PRODUCT

[75] Inventors: Joseph N. Schumacher; Freddie W. Best; Charles R. Green, all of Winston-Salem, N.C.

[73] Assignee: R. J. Reynolds Tobacco Company, Winston-Salem, N.C.

[21] Appl. No.: 679,009

[22] Filed: Apr. 21, 1976

Related U.S. Application Data

[63] Continuation-in-part of Ser. No. 578,806, May 19, 1975.

[51] Int. Cl.² .................................................. A24B 3/12
[52] U.S. Cl. .................................... 131/17 R; 131/144
[58] Field of Search ............... 131/2, 15 R, 15 C, 144, 131/17 R; 426/356, 357

[56] References Cited

U.S. PATENT DOCUMENTS 3,370,957  2/1918  Wagner et al. ...................... 426/357

*Primary Examiner*—Robert W. Michell
*Assistant Examiner*—V. Millin
*Attorney, Agent, or Firm*—Neuman, Williams, Anderson & Olson

[57] ABSTRACT

Addition of imidazole and benzimidazole compounds to tobacco or foodstuffs to enhance the flavor and/or aroma thereof.

7 Claims, No Drawings

TOBACCO PRODUCT

This application is a continuation-in-part of Ser. No. 578,806 filed May 19, 1975.

This invention relates to tabacco and food products and has for an object the provision of compositions and processes for improving the flavor and/or aroma of tobacco and foodstuffs.

It is well known in the flavoring art that the flavor and aroma of tobacco and food products are very important considerations insofar as the ultimate consumer is concerned. Considerable efforts are exerted by the manufacturers of such products to provide a product that will be acceptable to the consumer, particularly as regards flavor and aroma characteristics. Accordingly, it is a further object of this invention to provide a class of additive materials which, when incorporated into such consumer products, improve and enhance the flavor and aroma of these products, thereby increasing or enhancing the pleasure and other values that may be derived by the consumer from the use of these products.

A further object of this invention is to provide processes for enhancing or otherwise improving the flavor, aroma and other qualities of certain domestic, oriental, reconstituted or synthetic tobaccos which may be deficient in said flavor or aroma or other qualities.

A still further object of this invention is to provide smoking products, such as cigarettes, cigars or pipe tobacco, and a process for forming same whereby the flavor and aroma before and during smoking are improved or enhanced.

Another object of this invention is to provide processes for enhancing or otherwise improving the flavor, aroma or other qualities of foodstuffs which may be deficient in said flavor or aroma or other qualities.

Further and additional objects will appear from the following description and the appended claims.

In accordance with this invention, the flavor and/or aroma of tobacco and foodstuffs is improved by adding thereto a small amount of a compound selected from the group of compounds having the following general formulae:

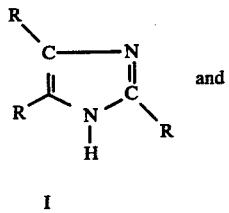 and 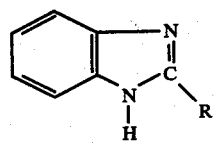

I        II where R = hydrogen, alkyl containing up to 6 carbon atoms, alkenyl containing up to 6 carbon atoms, or acyl containing up to 6 carbon atoms.

The compounds of Formula I are imidazoles and those of Formula II are benzimidazoles.

Representative of the additives of this invention are: imidazole, 2,4-dimethylimidazole, 4,5-dimethylimidazole, 2,5-dimethyl-4-isopropylimidazole, 4-ethylimidazole, 4-ethyl-2-isopropylimidazole, 4-ethyl-2-methylimidazole, 4-ethyl-2-propylimidazole, 4-isobutylimidazole, 2-isopropylimidazole, 4-isopropylimidazole, 2-isopropyl-4-methylimidazole, 4-methylimidazole, 2-pentylimidazole, 2,4,5-trimethylimidazole, 4-vinylimidazole, 4-isopropenyl-2-methylimidazole, 4-allyl-2-methylimidazole, 2-acetyl-4-methylimidazole, 4-acetyl-5-methylimidazole, 2-isovalerylimidazole, benzimidazole, 2-methylbenzimidazole, 2-butylbenzimidazole, 2-hexylbenzimidazole and 2-benzimidazolecarboxaldehyde.

The imidazole compounds of Formula I can be prepared by procedures known in the art. For example, these compounds can be prepared by reacting in liquid ammonia under pressure aliphatic aldehydes with 1,2-diketones. By the proper selection of aldehydes and 1,2-diketones having the desired alkyl groups, the substituted imidazoles of Formula I can be obtained. The preparation of imidazoles is described in the literature, for example, in a review by M. R. Grimmett published in ADVANCES IN HETEROCYCLIC CHEMISTRY, Vol. 12, Academic Press, New York, 1970, pages 103–183. A more recent paper by K. Wegner and W. Schunack in Arch. Pharm. 307 (6) 492–5 (1974) is also of interest. Likewise, the preparation of benzimidazoles is known in the art; for example, by catalytic condensation of o-dinitrobenzene with alcohols. Such method of synthesis is described, for example, in Chem. Abstracts 70, 115063k (1969).

In accordance with one embodiment of this invention, a compound of the classes described or mixtures thereof is added to tobacco or applied to a tobacco product or its component parts in amounts of from about 0.0005 to about 1.0 percent by weight of the tobacco or tobacco product. Preferably, the amount of additive is between about 0.001 and 0.1 percent by weight. However, while the additives are effective at low levels of concentration, the amount used will depend upon the amount of flavor and/or aroma desired and the particular compound or mixtures thereof that is used. The additives can be incorporated at any step in treatment of the tobacco but are preferably added after aging, curing and shredding and before the tobacco is formed into cigarettes or other products. Likewise, it will be apparent that only a portion of the tobacco need be treated and the thus treated tobacco can be blended with other tobaccos before the cigarettes or other tobacco products are formed. In such case, the treated tobacco may have the additive in excess of the amounts above indicated so that when blended with other tobaccos the final product will contain a percentage of additive within the indicated range.

The tobacco additives of the invention, when incorporated into tobacco products, improve the flavor and/or aroma of the product. However, it is to be appreciated that definition or characterization of flavor or aroma in the tobacco art is almost purely subjective and different smokers may define the same flavor or effect quite differently. Generally, these additives have an aroma or flavor which can be characterized as generally sweet, nutty and flue-cured like when compared with a control. Characterization of the effect of representative tobacco additives of this invention has been made as follows:

| Compound | Flavor Evaluation |
|---|---|
| Imidazole | Sweet, nutty, resembling flue-cured flavor. |
| 4,5-Dimethylimidazole | Slightly sweeter than control. |
| 4-Methylimidazole | Flue-cured, nutty, sweet, slight spicy note. |
| 2,4-Dimethylimidazole | Slightly woody, flue-cured flavor. |
| 2-Isopropylimidazole | Sugary, slightly sweet taste. |
| 2-Isopropyl-4-methylimidazole | Somewhat bland, slightly woody note. |
| 2,4,5-Trimethylimidazole | Waxy, sweet, flue-cured flavor. |

-continued

| Compound | Flavor Evaluation |
| --- | --- |
| Benzimidazole | Adds body. |
| 2-Methylbenzimidazole | Somewhat hot and peppery. |
| 2-Acetyl-4-methylimidazole | Sweet, adds body and burley character. |
| 4-Acetyl-5-methylimidazole | Sweet, flue-cured flavor, toasted note. |
| 2-Isovalerylimidazole | Sweet, smooth, nutty, flue-cured like. |

In the accordance with one specific embodiment of this invention, an aged flue-cured and shredded tobacco is sprayed with a 1% ethyl alcohol solution of imidazole in an amount to provide a tobacco containing 0.005 percent by weight of the additive on a dry basis. Thereafter, the alcohol is removed by evaporation and the tobacco is manufactured into cigarettes by the usual techniques. The cigarette when prepared as indicated has an improved character when smoked.

The additives falling within the scope of the invention may be applied to the tobacco by spraying, dipping or otherwise, utilizing suitable suspensions or solutions of the additives. Thus, water or volatile organic solvents, such as alcohol, ether, acetone, volatile hydrocarbons and the like, may be used as the carrying medium for the additives while being applied to the tobacco. Also, other flavor- and aroma-producing additives, such as those disclosed in U.S. pats. Nos. 2,766,145, 2,905,575, 2,905,576, 2,978,365 and 3,041,211, may be incorporated into the tobacco with the additives of this invention.

While the embodiment described above is principally useful in the manufacture of cigarette tobacco, it is also suitable for use in connection with the manufacture of pipe tobacco, cigars or other tobacco products. Furthermore, the additives can be added to certain tobacco substitutes of natural or synthetic origin and by the term "tobacco" as used throughout this specification is meant any composition intended for use by smoking or otherwise, whether composed of tobacco plant parts or substitute materials or both.

Also, this embodiment has been particularly described with reference to the addition of the additives directly to tobacco. However, it will be apparent that the additives can be applied to the paper of the cigarette or to the wrapper of a cigar. Also, they can be incorporated into the filter tip, the packaging material or the seam paste employed for gluing the cigarette paper. Thus, a tobacco product is provided which includes the specified additives and tobacco although in every instance the compound need not be admixed with the tobacco as above specifically described.

In accordance with another embodiment of this invention, a small amount of a compound of the classes described or mixtures thereof is incorporated into foodstuffs to impart thereto a desirable flavor and aroma. The term "foodstuffs" as used herein embraces both solid foods and drinking liquids which may have little or no food value. The flavorant compounds disclosed herein may be incorporated into the foodstuffs in any convenient manner using methods well known in the art. For example, the compounds may be included in a flavoring composition containing a substantial number of components with the composition then being used in appropriate amounts for flavoring the foodstuffs being processed. In general, the compounds defined by Formulae I and II are incorporated into the foodstuffs in amounts ranging from about 0.00001 percent to 0.1 percent by weight. Preferred use levels range from about 0.0005 to 0.005 percent by weight based on the weight of the foodstuff being treated.

The evaluation of representative imidazoles in a hot chocolate drink was carried out by adding sufficient compound to the drink to give a level of about 0.001 percent by weight. Characterization of the effect of these compounds in comparison with a control is shown below:

| Compound | Flavor Evaluation |
| --- | --- |
| 2-Methylimidazole | Enhanced both flavor and aroma. |
| 2,4-Dimethylimidazole | Enhanced flavor with slight bitter note. |
| 4,5-Dimethylimidazole | Agreeable slight bitter note. |
| 2-Isopropyl-4-methylimidazole | More cocoa character, stronger flavor. |
| 2-Acetyl-4-methylimidazole | Enhanced chocolate flavor, slightly bitter. |

Those modifications and equivalents which fall within the spirit of the invention are to be considered a part thereof.

What is claimed is:

1. A tobacco product or foodstuff having added thereto a small amount sufficient to alter the flavor or aroma of the tobacco product or foodstuff of a compound selected from the group of compounds having the following formulae:

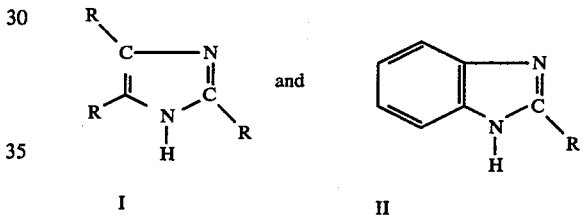

where R = hydrogen, alkyl containing up to 6 carbon atoms, alkenyl containing up to 6 carbon atoms, or acyl containing up to 6 carbon atoms.

2. A tobacco product according to claim 1 wherein the amount of said compound added to the product is between about 0.0005 and about 1.0 percent by weight of the product.

3. A foodstuff according to claim 1 wherein the amount of said compound added thereto is between about 0.00001 and about 0.1 percent by weight of said foodstuff.

4. A process for improving the flavor or aroma of tobacco or foodstuffs which comprises adding thereto a small amount sufficient to alter the flavor or aroma of the tobacco or foodstuff of a compound selected from the group of compounds having the formulae:

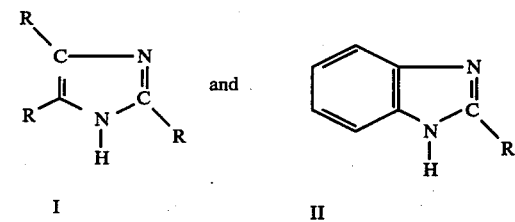

where R = hydrogen, alkyl containing up to 6 carbon atoms, alkenyl containing up to 6 carbon atoms, or acyl containing up to 6 carbon atoms.

5. The process of claim 4 wherein the compound of the said formula is added to the tobacco in an amount between about 0.0005 and about 1.0 percent by weight.

6. The process of claim 4 wherein the compound of the said formula is added to the foodstuff in an amount between about 0.00001 and about 0.1 percent by weight of said foodstuff.

7. A process for improving the flavor or aroma of a tobacco product which comprises adding thereto a small amount sufficient to alter the flavor or aroma of the tobacco product of a compound selected from the group of compounds having the following formulae:

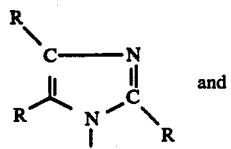 and 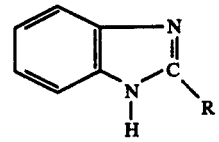

I                            II where R = hydrogen, alkyl containing up to 6 carbon atoms, alkenyl containing up to 6 carbon atoms, or acyl containing up to 6 carbon atoms.

* * * * *